United States Patent [19]

Cox

[11] 3,854,609
[45] Dec. 17, 1974

[54] BOOM SUPPORTED MATERIAL HANDLING FORK

[76] Inventor: Randal A. Cox, Rural Rt. 1, Van Wert, Iowa 50262

[22] Filed: Mar. 12, 1973

[21] Appl. No.: 340,173

[52] U.S. Cl................ 214/147 G, 294/88, 294/107
[51] Int. Cl............................................. B66c 3/04
[58] Field of Search....... 214/147 G, 147 R; 294/88, 294/107

[56] References Cited
UNITED STATES PATENTS

| 3,023,044 | 2/1962 | Drain | 294/88 |
|---|---|---|---|
| 3,079,020 | 2/1963 | Gustine | 214/147 G |

FOREIGN PATENTS OR APPLICATIONS

| 851,682 | 10/1952 | Germany | 214/147 R |
|---|---|---|---|
| 1,327,125 | 4/1963 | France | 294/88 |

Primary Examiner—Albert J. Makay
Assistant Examiner—George F. Abraham
Attorney, Agent, or Firm—Zarley, McKee & Thomte

[57] ABSTRACT

A boom having pivotally interconnected inner and outer sections is mounted on the three-point hitch of a tractor. A pair of vertically adjustable support legs are connected to the cross arm of the inner boom section for supporting the boom when the tractor lift arms are in the lowered position. A fork unit is pivotally connected to the outer end of the outer section and includes a pyramid-shaped frame having a hollow interior with oppositely disposed downwardly extending side walls. A pair of fork members each include two clevises engaging the frame side walls. A hydraulic cylinder extends between the oppositely disposed frame side walls and through openings formed therein for engagement with upstanding ear elements on the upper edge of the fork members whereby extension of the hydraulic cylinder pivots and forks towards each other and contraction of the hydraulic cylinder pivots the fork members outwardly.

3 Claims, 6 Drawing Figures

PATENTED DEC 17 1974　　　3,854,609
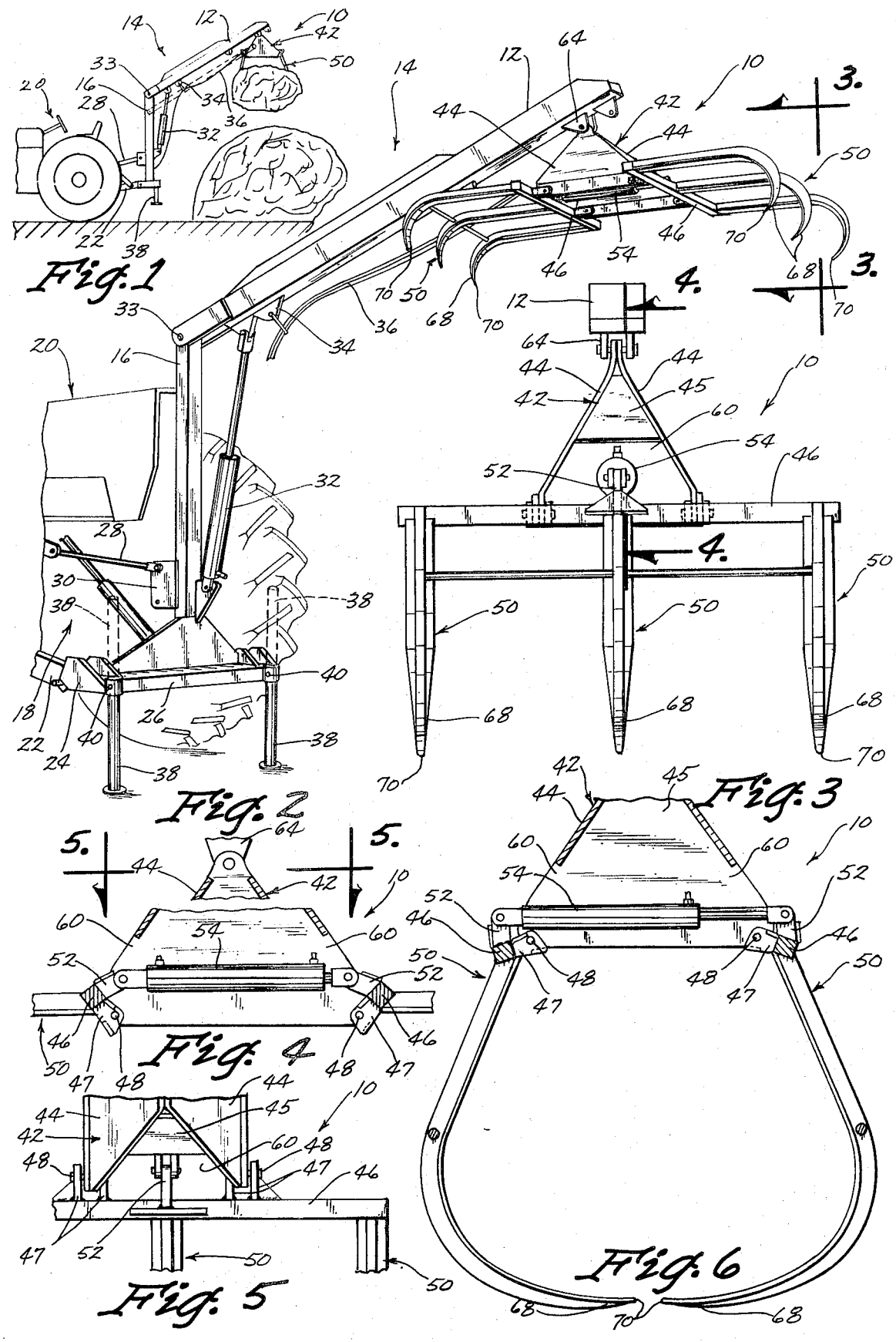

BOOM SUPPORTED MATERIAL HANDLING FORK

Material handling equipment commonly available usually requires at least two people to operate it. Further, presently available hay-handling equipment is not suitable for handling the giant bales or stacks of hay. There are also other uses for a single man-operated material handling implement such as moving feed bunks.

The material-handling implement of this invention is mounted on the three-point hitch of a tractor and includes a fork unit on the outer boom section. The fork unit includes oppositely disposed cooperating fork members connected by clevises to opposite side walls of the hollow pyramid-shaped frame. The hydraulic cylinder extends through openings formed in oppositely disposed walls in the frame whereby the hydraulic cylinder enages upstanding ears on the upper edges of the fork members such that expansion of the hydraulic cylinder brings the fork members together and contraction moves them apart. The fork unit is self-centering over a load which is to be moved as the fork unit is pivotally connected to the boom and the connection of the hydraulic cylinder to the fork members allows the fork members to center over the material to be moved such that an equal force is being applied to the material through each fork member.

Safety is a significant advantage of the material-handling implement of this invention. Since the boom is connected to the three-point hitch of the tractor a substantial load on the boom while the tractor is positioned on an incline will cause the tractor to align itself along a line straight up and down the hill. In other words, the tractor will turn about a vertical axis through the longitudinal axis of the rear wheels and thereby avert a tipping accident.

The positioning of the hydraulic cylinder connecting the two boom sections close to the cross arm on the inner section keeps the load close to the rear axle of the tractor thereby minimizing the tendency to raise the front end of the tractor.

The use of the vertically adjustable support stand allows the boom to be readily mounted and be dismounted. All that is required is to operate the lift arms relative to the connecting brackets. When the boom is securely mounted on the lift arms the supports may be raised. When the tractor is not supporting the boom the boom is supported on the two support stands and the fork unit.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary side elevation view showing the boom and fork mounted on a tractor and the fork being used to handle stacked hay.

FIG. 2 is an enlarged fragmentary perspective view of the boom and fork in a raised position.

FIG. 3 is a cross sectional view taken along line 3 — 3 in FIG. 2.

FIG. 4 is a cross sectional view taken along line 4 — 4 in FIG. 3.

FIG. 5 is a cross sectional view taken along line 5 — 5 in FIG. 4; and

FIG. 6 is a view similar to FIG. 4 but showing the fork in a closed position.

The material-handling fork of this invention is referred to in FIG. 2 generally by the reference numeral 10 and is shown mounted on the outer section 12 of a boom 14 having an inner section 16 mounted on the three-point hitch 18 of a tractor 20.

Tractor 20 includes the usual lift arms 22 detachably engaging mounting brackets 24 on a cross arm 26 at the lower end of the inner boom section 16. An upper stabilizer arm 28 is connected between the tractor over the lift arms 22 and is connected to the inner boom section 16 through spaced apart mounting plates 30.

A hydraulic cylinder 32 is mounted at its lower end closely adjacent the cross arm 26 and is connected to the inner end of the outer boom section 12 closely adjacent the pivot 32 therebetween. An apertured ear 34 is provided on the outer boom section 12 for supporting loads or for use in positioning the hydraulic cables 36. It is also noted that the outer boom section 12 is extendable in a conventional manner.

The cross arm 26 also includes at its outer ends vertically adjustable supports 38 which engage the ground when in their lower position and when the lift arms 22 of the tractor are lowered as seen in FIG. 2. A pin 40 may selectively lock the supports 38 in any desired position as indicated by the solid and dash-line representations of the supports 38.

The fork unit 10 includes a basically A-shaped frame 42 which more specifically is hollow on the interior and pyramid in shape. A pair of downwardly extending side walls 44 are interconnected at their ends by end walls 45. Each of the fork units include a transversely extending pivot arm 46 and each arm includes two pairs of clevises 47 connected by pins 48 to the lower edges of the side walls 44 of the frame 42. The pivot arms 46 also each include one upwardly extending ear element 52 to which a double-acting hydraulic cylinder 54 is connected. Each pivotal arm 46 includes three J-shaped fork members 50. It is seen that the cylinder 54 is horizontally arranged substantially within the hollow pyramid-shaped frame member 42 and the walls 44 include openings 60 through which the opposite ends of the hydraulic cylinder extend for connection to the ears 52.

An upstanding ear 62 is provided on the vertex of the frame for pivotal connection to an ear 64 on the outer end of a boom section 12.

The fork members 50 each include three spaced apart teeth 68 which substantially meet at their points 70 when the fork is in a closed position as seen in FIG. 6.

In operation it is seen that the boom supported material handling fork of this invention is readily mounted on the three-point hitch of a tractor 20 by connecting the stabilizer arm 28 and the lift arms 22 to the brackets 30 and 22 respectively. The vertical supports 38 may be raised if desired when the boom is being operated. The boom may be positioned as desired through operation of the lift arms and the hydraulic cylinder 32 which controls the position of the outer boom section 12. The outer boom section 12 may be extended also as desired and the fork unit 10 when used is connected to the outer boom section 12 through the downwardly extending ear 64. When the fork unit 10 is not being used the boom may be used for other lifting purposes. The fork unit is self-centering by virtue of the hydraulic cylinder being connected directly to the fork members 50 through the upstanding ears 52 on the pivot arms 6.

The fork is free to pivot through its connection to the outer boom section 12 and because of the self-centering capability of the fork members an equal force will be applied by both fork members to the material being handled even if the fork is arranged at an angle to the material. Extension of the hydraulic cylinder 54 will cause the fork members to pivot towards each other while contraction of the hydraulic cylinder will open the fork. The hydraulic cylinder is substantially enclosed and protected by the hollow pyramid-shaped frame 42.

The fork unit 10 may be readily disassembled by removal of the pin connecting it to the boom and then removing the four pins connecting each of the fork assemblies to the A-shaped frame 42. The pins connecting the hydraulic cylinder 54 would also be removed. This ease of disassembly enables the entire fork unit to be readily stored and shipped in component parts thereby minimizing total space requirements.

I claim:

1. A material handling unit comprising,
a boom,
a power means for raising and lowering the outer end of said boom;
a fork unit on the outer end of said boom; said fork unit including a pyramid-shaped frame having a hollow interior, an apex, and side and end walls extending downwardly from said apex; said frame having its apex pivotally and detachably connected to said boom and a pair of cooperating fork members having upper pivot arms each of which includes spaced apart clevises pivotally and detachably connected to the lower ends of the sides of said pyramid frame, an upstanding ear on each of said pivot arms of said fork members offset from the pivotal axis of the clevis to provide a lever arm for pivoting said fork member, and
a hydraulic power cylinder extending between the side walls of said frame and having its opposite ends connected to said upstanding ears on the pivot arms of said fork members for pivoting said fork members to a closed position when said cylinder is extended and to an open position when said cylinder is contracted, said end walls terminating closely adjacent said power cylinder and above the lower ends of said side walls to define end wall openings, and said ears on said pivot arms are positioned on the exterior of said pyramid-shaped frame and adjacent the end walls of said frame having said openings through which opposite ends of said hydraulic cylinder extend when said cylinder is extended, said cylinder ends being within said end walls when said cylinder is in a nonextended position.

2. A material handling unit comprising,
a boom mounted at its lower end on the rear end of a tractor, by means of a three-point hitch, said hitch having lifting arms, said boom including inner and outer pivotally connected boom sections and said inner boom section including a cross member to which the lifting arms of said three-point hitch are connected.
a pair of vertically adjustable supports carried on said cross member adapted to engage the ground and support said boom when said lift arms are in a lowered position whereby said lift arms may be lowered further to be disconnected from said cross arm,
a power means for raising and lowering the outer end of said boom,
a fork unit on the outer end of said boom; said fork unit including an A-shaped frame having its apex pivotally connected to said boom and a pair of cooperating fork members having upper pivot arms pivotally connected to the lower ends of the sides of said A-shaped frame, an upstanding ear on each of said pivot arms of said fork members, and
a hydraulic power cylinder extending between the sides of said A-shaped frame and having its opposite ends connected to said upstanding ears on the pivot arms of said fork members for pivoting said fork members to a closed position when said cylinder is extended and to an open position when said cylinder is contracted.

3. The structure of claim 2 wherein said power means includes a hydraulic cylinder connected at its lower end to said inner section closely adjacent said cross member and connected to said outer section adjacent the pivotal connection between said inner and outer boom section.

* * * * *